Jan. 21, 1930.  J. E. BENTON  1,744,355

SHAVING CUP

Filed April 16, 1928

Witness
Vinton
Read.

Inventor
John E. Benton
by Bair, Freeman & Sinclair Attorneys

Patented Jan. 21, 1930

1,744,355

UNITED STATES PATENT OFFICE

JOHN E. BENTON, OF ALBIA, IOWA

SHAVING CUP

Application filed April 16, 1928. Serial No. 270,382.

The object of this invention is to provide an improved construction for a shaving cup or lather mug in which simple and efficient means is provided for applying heat to the lather and brush.

Another object of the invention is to provide a device of the class described which includes an annular jacket for containing hot water for the purpose of keeping the lather hot, the hot water in the jacket also being readily available for other purposes such as application to soap contained in the cup or for direct application to a skin surface to be shaved.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1:
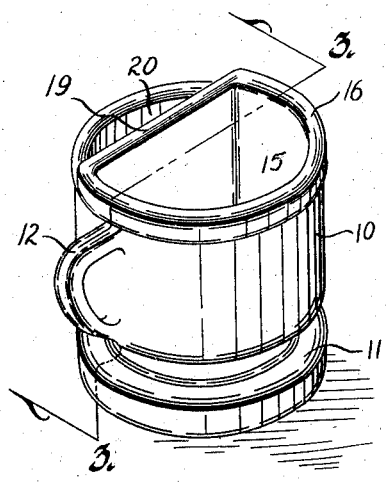
Fig. 1 is a perspective view of a shaving cup constructed in accordance with my invention.

It is often difficult to keep lather used for shaving purposes in satisfactory heated condition for any length of time without the constant addition of new quantities of hot water. In the shaving operation it is also desirable, particularly in going over the surface a second time, to apply water to the skin to keep it moist in order to facilitate the action of the razor. In my improved device I have provided simple and efficient means for not only keeping the lather and brush heated for a considerable period of time without attention from the workman, but also for providing a convenient means for obtaining hot water for direct application to the skin when desired.

In the accompanying drawings, I have illustrated a cup or mug which includes an outer shell 10 having a bottom 11 and also having a laterally projecting handle 12.

Adjacent the bottom 11 there is provided a cylindrical recess 13 which is concentric with, but of less diameter than the wall 10.

There is also provided a central removable core which includes a lower cylindrical portion 14 adapted to fit snugly within the cylindrical recess 13, and an outwardly sloping portion 15, which in general is substantially frusto-conical in shape and terminates at its upper end in a peripheral flange 16 overlapping the upper margin of the wall 10. The core thus formed is open at its top and when in position within the outer shell, the bottom of the cylindrical portion 14 rests against the bottom 11. This cylindrical portion preferably is of a diameter to receive an ordinary cake of shaving soap such as 17.

The outer member including the wall 10 and bottom 11, and also the inner member or core including the portions 14 and 15 may be made of any suitable material such as chinaware, queensware, or metal and may be of any desired size and shape except as herein specified.

When the core is mounted within the outer shell there is provided between these members, an annular space 18 which is of irregular shape, of greater width at its lower than at its upper end and extending nearly to the bottom of the outer member and to the space occupied by the soap 17. The annular space 18 is designed to receive hot water, which preferably substantially surrounds the core and serves to keep its contents in heated condition, including the soap 17 and the lather formed therefrom, as well as a shaving brush which may be located within the device.

Figure 2:
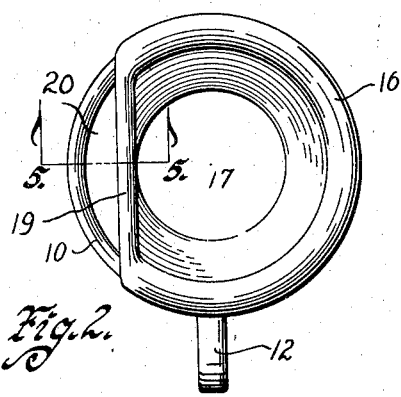
Fig. 2 is a plan view of the same.
Figure 3:
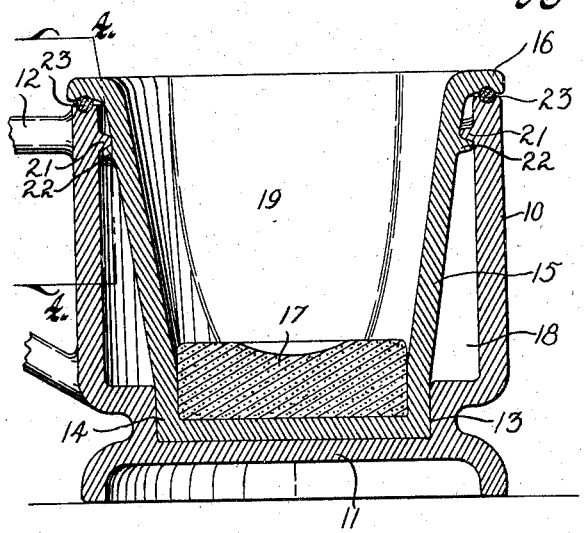
Fig. 3 is a vertical section on an enlarged scale on the line 3—3 of Fig. 1.
Figure 5:
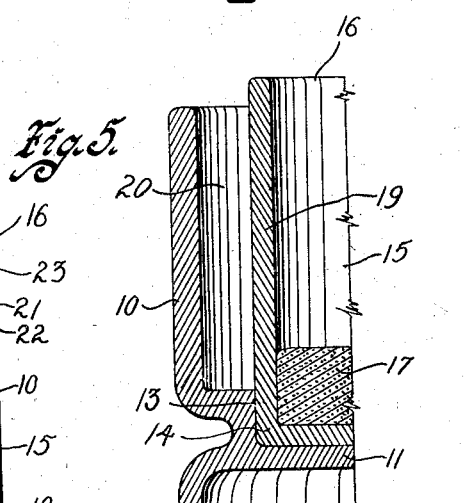
Fig. 5 is a vertical section through a part of the device on the line 5—5 of Fig. 2.
Figure 4:
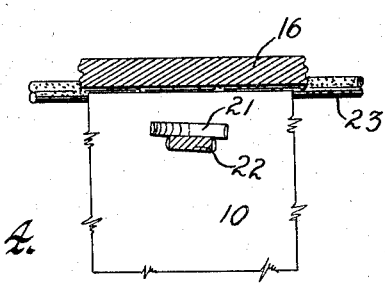
Fig. 4 is a detail sectional elevation illustrating the locking means between the core and outer shell and is taken on the line 4—4 of Fig. 3.

At one side the core is formed with a straight wall 19 extending substantially from its bottom to its top and arranged on a segment of a cylinder, as clearly shown in Fig. 2. The overlapping flange 16 is omitted from the straight wall 19 so that the upper end of said straight wall is spaced from the adjacent portion of the wall 10 to provide a well 20 open at its top and communicating with the water jacket 18.

Any suitable means may be employed for securely holding the core within the cup proper or shell and for this purpose, I have illustrated inclined lugs 21 formed on the inner surface of the wall 10 and coacting inclined lugs 22 formed on the outer surface of the core member 15. The lugs 22 are adapted to be seated beneath the lugs 21 by manually placing the core member within the wall in a position where said lugs are not in registration and then imparting to the core member a slight rotary motion to secure an engagement similar to a threaded connection in a common manner.

To effectively seal the water jacket between the shell and core it may be desirable to mount a gasket 23 on the upper margin of the wall 10 to be engaged by the overlapping flange 16. For this purpose the upper margin of the wall 10 may be grooved or concaved if desired and the gasket may be omitted from that portion of the wall not covered by the flange.

When the device is used in shaving operations, water is supplied to the interior of the core from any suitable source and is worked up into a lather by the use of a brush in contact with the soap 17 in the ordinary manner. Prior to or just after the production of the lather the water jacket 18 is supplied with a quantity of hot water, which may be introduced through the well 20 and this body of hot water surrounding the core and its contents serves to keep the same in satisfactorily heated condition for a considerable period of time. From time to time additional hot water may be obtained from the well 20 by introducing the end of the brush or the tips of the fingers, either for supplying additional water to the lather or for applying water directly to a skin surface. This obviates the necessity of frequently going to a hot water tap or other source of supply to obtain hot water for such purposes.

Ordinarily, a right-handed person will hold the cup in his left hand and manipulate the brush with his right hand, tipping the cup slightly to the right during this operation. For this reason it is usually best to locate the well 20 at the left of the handle 12, as shown in Figs. 1 and 2 so that no water will be spilled from the water jacket 18 by a slight tipping, as indicated.

When it is desired to empty the water from the jacket 18 the cup may be tipped to the left or in such direction that the well 20 will be downward and the water will flow from the mouth of the well.

When desired, the core 15, together with the soap 17 may be entirely removed from the shell or outer body for thoroughly cleaning all the parts, after which the core is readily inserted in place, as previously described.

The cylindrical recess 13 permits the lower cylindrical part 14 of the core, containing the soap 17, to descend to a lower level than that part of the core which is surrounded by the water jacket 18. This arrangement serves to somewhat insulate and protect that portion of the core occupied by the soap, so that the soap itself is not subjected to too much heat. It is desirable to place a quantity of hot water in the jacket successively for each customer, and if the soap were not protected from this hot water, it would be melted and wasted. This protection is accomplished in the present construction by having the core portion 14 fit snugly within the recess 13 and against the bottom 11 of the cup.

I claim as my invention:

1. A device of the class described, comprising a cup formed with a cylindrical recess at its bottom, a removable core adapted to have its lower end inserted in said recess and to fit snugly therein, said core having its wall extending upwardly within the wall of the cup and spaced therefrom to provide an annular water jacket, said core being formed at its upper end with a peripheral flange overlapping the upper margin of the wall of the cup.

2. A device of the class described, comprising a cup, a core removably mounted within the cup and arranged to receive soap and lather, said core being spaced inwardly from the wall of the cup to provide a jacket for hot water between the walls of said members, and means for insulating the extreme lower end of said core whereby soap contained therein will be protected from too intimate contact with the hot water jacket.

3. A device of the class described, comprising a cup, a core removably mounted within the cup and arranged to receive soap and lather, said core being spaced inwardly from the wall of the cup to provide a water jacket between the walls of said members, the extreme lower end of said core being insulated relative to the water jacket, said core having a portion engaging the wall of the cup at its upper end to provide a closure for said water jacket, said closure being omitted at a relatively small portion of the circumference of the wall of the cup to provide an open-ended well.

Des Moines, Iowa, April 12, 1928.

JOHN E. BENTON.